United States Patent
Brewster

(10) Patent No.: US 8,181,944 B2
(45) Date of Patent: May 22, 2012

(54) VIBRATION DAMPER

(75) Inventor: Barrie Dudley Brewster, Brighton (GB)

(73) Assignee: Edwards Limited, Crawley, West Sussex (GB)

( * ) Notice: Subject to any disclaimer, the term of this patent is extended or adjusted under 35 U.S.C. 154(b) by 1269 days.

(21) Appl. No.: 10/588,470

(22) PCT Filed: Feb. 2, 2005

(86) PCT No.: PCT/GB2005/000354
§ 371 (c)(1), (2), (4) Date: May 17, 2007

(87) PCT Pub. No.: WO2005/078288
PCT Pub. Date: Aug. 25, 2005

(65) Prior Publication Data
US 2008/0023896 A1    Jan. 31, 2008

(30) Foreign Application Priority Data
Feb. 6, 2004 (GB) .................................. 0402625.8

(51) Int. Cl.
*F16M 1/00* (2006.01)
*F16M 13/00* (2006.01)
(52) U.S. Cl. .................. 267/136; 267/140.13
(58) Field of Classification Search .............. 267/136, 267/137, 140.11, 140.12, 140.13; 248/560, 248/576, 638; 417/363; 285/49
See application file for complete search history.

(56) References Cited

U.S. PATENT DOCUMENTS

| | | | |
|---|---|---|---|
| 2,578,773 A * | 12/1951 | Arthur | 454/74 |
| 2,695,167 A * | 11/1954 | Ramos et al. | 267/211 |
| 3,000,389 A | 9/1961 | Alsager et al. | |
| 3,799,531 A * | 3/1974 | Yamazaki et al. | 267/140 |
| 3,985,378 A | 10/1976 | Müller | |
| 4,352,643 A * | 10/1982 | Iijima | 417/313 |
| 4,755,025 A * | 7/1988 | Cutburth | 359/896 |
| 4,928,998 A * | 5/1990 | Brandener | 285/49 |
| 5,090,746 A | 2/1992 | Holzhausen | |
| 5,799,456 A * | 9/1998 | Shreiner et al. | 52/396.04 |
| 5,971,439 A | 10/1999 | Cwik | |
| 5,992,896 A * | 11/1999 | Davey et al. | 285/49 |
| 6,065,780 A | 5/2000 | Hiroshima | |
| 2005/0013703 A1* | 1/2005 | Cafri et al. | 417/363 |
| 2005/0106043 A1* | 5/2005 | Casaro et al. | 417/363 |

FOREIGN PATENT DOCUMENTS

| | | |
|---|---|---|
| DE | 79 33 066 U1 | 2/1980 |
| DE | 78 05 710 U1 | 12/1981 |
| DE | 100 01 509 A1 | 7/2001 |
| EP | 1 270 949 A1 | 1/2003 |
| EP | 1 293 682 A2 | 3/2003 |
| GB | 1 541 294 | 2/1979 |
| WO | WO 01/51817 A1 | 7/2001 |
| WO | WO 02/086325 A1 | 10/2002 |

OTHER PUBLICATIONS

Kitajima Hiroyuki; Patent Abstracts of Japan, abstract of JP 56064195; "Exhaust System in Electron Microscope or the Like," Jun. 1, 1981; Jeol Ltd.

(Continued)

*Primary Examiner* — Melody Burch

(57) ABSTRACT

A pre-compressed vibration damper is provided for inhibiting transfer of vibration to an apparatus during the evacuation thereof by a pump.

20 Claims, 6 Drawing Sheets

OTHER PUBLICATIONS

Tashiro Yoshiyuki; Patent Abstracts of Japan, abstract of JP 10252963, "Vibration Damping Bellows Joint," Sep. 22, 1998; Toofure KK.

Odate Yoshinobu, Patent Abstracts of Japan, abstract of JP 2002303294, "Vacuum Pump," Oct. 18, 2002; BOC Edwards Technologies Ltd.

United Kingdom Search Report of Application No. GB 0402625.8; Date of mailing: Jun. 16, 2004; Claims searched: 1-16, 18-28 & 30; Date of search: Jun. 15, 2004.

United Kingdom Search Report of Application No. GB 0402625.8; Date of mailing: Jul. 13, 2004; Claims searched: 17-28 & 30; Date of search: Jul. 12, 2004.

United Kingdom Search Report of Application No. GB 0402625.8; Date of mailing: Jul. 13, 2004; Claims searched: 29 & 30; Date of search: Jul. 12, 2004.

PCT Invitation to Pay Additional Fees of International Application No. PCT/GB2005/000354; Date of mailing: May 11, 2005.

PCT International Search Report of International Application No. PCT/GB2005/000354; Date of mailing of the International Search Report: Jun. 30, 2005.

PCT Written Opinion of the International Searching Authority of International Application No. PCT/GB2005/000354; Date of mailing: Jun. 30, 2005.

* cited by examiner

VIBRATION DAMPER

FIELD OF THE INVENTION

The present invention relates to vibration dampers.

BACKGROUND OF THE INVENTION

Vibration dampers are used to reduce the vibration transmitted from a high-vacuum pump, for example, a turbomolecular pump, to apparatus to be evacuated during a pumping operation. Vibration dampers are particularly advantageous when vacuum pumps are used to evacuate apparatus which is sensitive to mechanical vibration. For example, vibrations transmitted to an evacuated Scanning Electron Microscope could lead to inaccuracies in measurements being taken by the microscope, and vibrations transmitted to a process tool could cause anomalies in products being manufactured within.

With reference to FIG. 2, a vibration damper 0 is typically connected between the fluid exhaust 9 of the apparatus 7 to be evacuated and the fluid inlet 10 of the vacuum pump 8. FIG. 1 illustrates the configuration of a known vibration damper 0 in more detail. The damper 0 includes two flanges 2,3 each welded to a respective end of a steel bellows 4. Each flange 2, 3 has an aperture 2a, 2b formed therein, the apertures 2a, 2b being axially aligned. The bellows 4 defines a flow path 4a through the damper 0 for fluid pumped from the apparatus 7 by the pump 8.

A mechanical support 5 is provided to prevent the bellows 4 collapsing under compression when the fluid in the flow path 4a is at low pressure that is, under vacuum and external forces due to atmospheric pressure act to compress the damper 0. In the example shown in FIG. 1, the mechanical support 5 is provided by an elastomeric cylinder surrounding the bellows 4 between the flanges 2, 3.

Interlinking members 6a, 6b are provided to prevent the bellows 4 from extending under the weight of the pump 8 suspended from flange 3 when the apparatus is not under vacuum. In the example shown in FIG. 1, member 6a is in the form of a V-shaped metallic strap welded to the top of flange 2, and member 6b is in the form of a similar strap welded to the bottom of flange 3 so that the members 6a, 6b are linked. In the illustrated example, when the damper 0 is not connected to any other components, the members 6a, 6b are not in contact.

The parameter governing transmission of vibration from the pump 8 to the apparatus 7 is the stiffness (k) of the damper 0. Bellows 4 are typically chosen to define the flow path 4a in view of their low inherent axial stiffness, so as to cause minimal transmission of vibration to the apparatus 7. The interlinking straps 6a, 6b are not in contact when under vacuum conditions, where the damper 0 experiences compressive loading. Consequently, the primary route for vibration transmission is through the mechanical support 5.

Vibration dampers positioned between the apparatus 7 and the pump 8, as shown in FIG. 2, are subject to a large static force acting on the lower end of pump 8 which acts to force the pump 8 towards the apparatus 7, this force being associated with the pressure difference between atmospheric and vacuum conditions. This force must be borne by the mechanical support 5 of the damper 0. However, when known elastomeric mechanical supports 5 are exposed to such loading conditions, their hyperelasticity, reflected in a non-linear progressive stiffness characteristic, causes them to become increasingly stiff or rigid. Under such compressive loading conditions, the increased rigidity enhances transmission of vibration to the apparatus 7 rather than reducing it. Furthermore, known elastomeric mechanical supports 5 typically experience failure in a buckling mode.

It is an object of the present invention to provide a vibration damper that substantially reduces the problems associated with these prior art vibration dampers.

SUMMARY OF THE INVENTION

According to one aspect of the present invention, there is provided a vibration damper for inhibiting transfer of vibration to an apparatus during the evacuation thereof by a pump, the damper comprising a bellows arrangement for isolating from the ambient atmosphere, fluid drawn from the apparatus by the pump, and means for limiting axial compression of the bellows arrangement during use of the damper, wherein the damper is axially pre-compressed.

In practical terms, the permitted magnitude of the extension of the damper is governed by the flexibility of the bellows, the space available in the location of the apparatus and the flexibility of the peripheral equipment attached to the vacuum pump. This is typically 5 to 10 mm. Since the magnitude of the static force exerted on the pump is also predetermined, the stiffness characteristic of the damper is restricted. In the simplest, the relationship between force and displacement may be linear as shown at 19 in FIG. 6 such that the stiffness has a constant value. In known prior art systems as discussed above, the mechanical support is formed from an elastomeric material. Such materials have a hyperelastic load/deformation relationship such that they have a progressive stiffness characteristic. This type of relationship is represented at 20 in FIG. 6. It can be seen that in the typical loading regime (denoted F) the stiffness curve 20 has become steep indicating an increased value of stiffness. It is desirable that the stiffness characteristic associated with the damper, when loaded, is small by design, as represented at 18 in FIG. 6, such that transmission of vibration to the apparatus is minimised. However, overall permitted extension of the damper 1 is predetermined as discussed above, so pre-compression of the damper prior to installation between the apparatus and the pump can provide a much higher stiffness characteristic at lower displacement, represented at 17 in FIG. 6, such that the required applied load can be borne by the damper whilst not exceeding the extension limits. Therefore, a mechanical support of much lower stiffness, and consequently better vibration transmission properties, can be provided.

According to another aspect of the present invention there is provided a vibration damper for inhibiting transfer of vibration to an apparatus during the evacuation thereof by a pump, the damper comprising a bellows arrangement for isolating from the ambient atmosphere, fluid drawn from the apparatus by the pump, the bellows arrangement extending about an axis and resistive means arranged about said axis and under tension in such a way that when the damper is subjected to an external axial force tending to compress the bellows arrangement, the resistive means is subjected to a tensile force, the resistance to extension of the resistive means opposing axial compression of the bellows arrangement.

A further problem associated with known vibration dampers is that in the event of pump failure through rotor seizure, they provide an inherent weakness which can be of safety concern. When a pump seizes, there is a large quantity of energy associated with the angular momentum of the rotor, which energy needs to be dissipated. In some circumstances, the rotor blades are stripped from the rotor thus causing most of the energy to be absorbed as the destruction and deformation of the internal components occurs, and hence the failure can be contained within the pump housing. However, in some pumps, such as those with a bell shaped rotor, the rotor is likely to be split into a small number of sections, each section having a significant quantity of rotational momentum with a large impulse. When each section collides with the pump housing, a large torque may be transmitted from the rotor to the pump housing. Consequently, the pump housing will tend to rotate. Since the apparatus to which the pump is attached will have a significant mass and will be unlikely to shift, the highest point of stress will be at the vibration damper where the apparatus and pump are joined together. Conventional vibration dampers have minimal resistance to such rotational loading and are damaged, resulting in the pump becoming detached from the apparatus and causing further damage or injury.

It is, therefore, a further object of the present invention to provide a vibration damper that inhibits any such rotational movement of the vacuum pump and, consequently, enhances safety of the system.

According to another aspect of the present invention there is provided a vibration damper for inhibiting transfer of vibration to an apparatus during the evacuation thereof by a pump, the damper comprising a bellows arrangement for isolating from the ambient atmosphere, fluid drawn from the apparatus by the pump, one end of the bellows arrangement being connected to a flange from which at least one member extends axially towards the other end of the bellows arrangement, and means for contacting said at least one member upon rotation of one end of the bellows arrangement relative to the other to inhibit relative rotational movement therebetween.

BRIEF DESCRIPTION OF THE DRAWINGS

The invention is described below in greater detail by way of example only with reference to the accompanying drawings, in which.

DETAILED DESCRIPTION OF THE INVENTION

Figure 2:
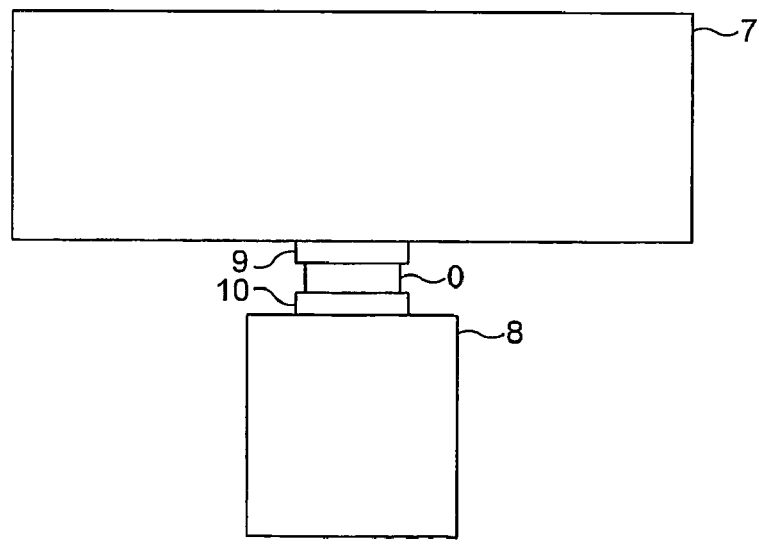
FIG. 2 is a schematic representation of a vacuum system in which a vibration damper may be used.

FIG. 2 illustrates a generic vacuum system which is suitable for incorporating a vibration damper 1 of the present invention. As such, references will be made to components shown therein, in combination with subsequent drawings.

Figure 1:
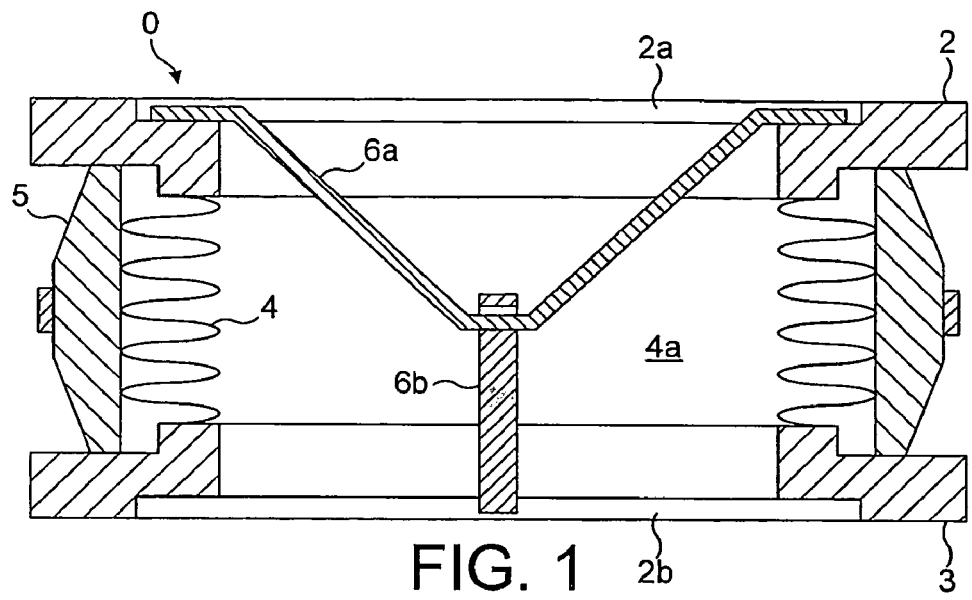
FIG. 1 is a schematic cross section of a conventional vibration damper.
Figure 3:
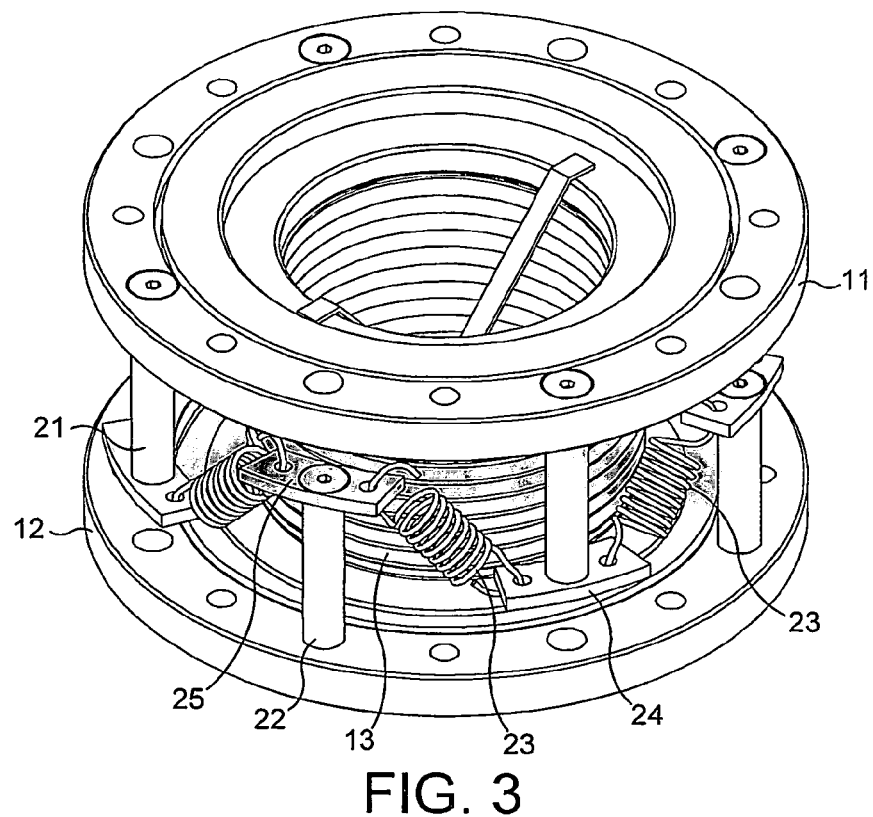
FIG. 3 is a schematic perspective view of a vibration damper according to one embodiment of the present invention.
Figure 4:
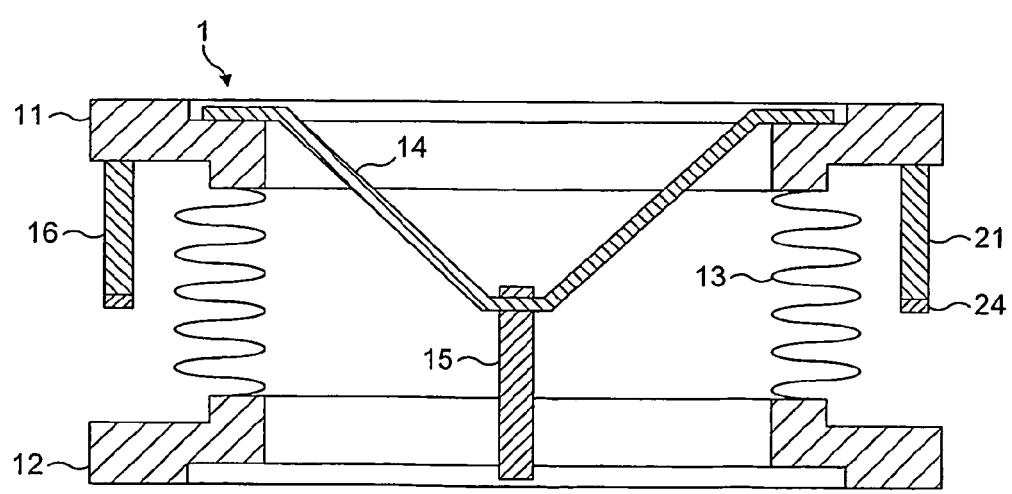
FIG. 4 is a schematic cross sectional representation of the of FIG. 3.
Figure 5:
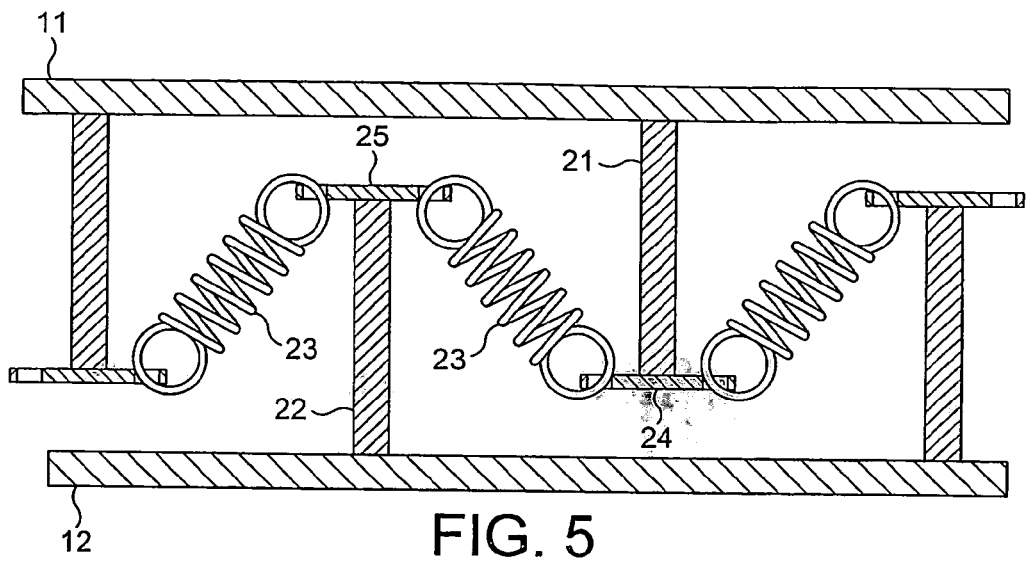
FIG. 5 is a flat sheet development of the external compression resisting means of the vibration damper illustrated in FIG. 3.

As shown in FIGS. 3, 4 and 5, vibration damper 1 comprises a first flange 11 for connecting the damper 1 to a flange of the fluid exhaust 9 of the apparatus 7 and a second flange 12 for connecting the damper 1 to fluid inlet 10 of the vacuum pump 8. The damper 1 further comprises a compliant gas barrier or shield 13, such as a convoluted bellows of a generally cylindrical form connected with a gas tight seal at either end to respective flanges 11, 12 in order to define a fluid flow path from the apparatus 7 to the vacuum pump 8. Within the confines of the bellows 13, two interlinking V-shaped straps 14, 15 are provided. One strap 14 is welded at either end to the first flange 11 at diametrically opposed positions. The other strap 15 is welded at either end to the second flange 12, also at diametrically opposed positions of the flange. The two straps 14, 15 meet and over lap at their central portions such that together they form a link that prevents the bellows from extending beyond a predetermined axial displacement. In contrast to the conventional damper illustrated in FIG. 1, the two linking straps 14, 15 are pre-tensioned such that the damper 1 is permanently compressed from its equilibrium position. In other words, in its inactive/unloaded state the damper 1 experiences a loading or pre-compression.

Extending around the bellows 13 is a resilient structure 16 that is able to withstand significant compressive loading. The configuration of this structure 16 has been designed to avoid buckling failure modes associated with a compressively loaded structure by forming an arrangement that deflects primarily in tension. As shown in FIGS. 3 and 5, in this example four support members 21 are connected to the first flange 11 and four additional support members 22 are connected to the second flange 12. These support members 21, 22 each extend axially towards the flange to which they are not directly connected. At the distal end of each support member 21, 22 is connected a circumferentially extending tab 24, 25. Attached to each end of a tab 24, 25 is a resistive element, in this embodiment in the form of a tension spring 23, typically a metal coil tension spring. Each tension spring 23 is attached at one end to a tab 24, tab 24 being indirectly attached to the first flange 11, and at the other end to a tab 25, tab 25 being indirectly attached to the second flange 12.

As the vacuum pump 8 evacuates apparatus 7 the pressure within the entire vacuum system, incorporating the apparatus 7, damper 1, pump 8 and any equipment in fluid communication therewith, reduces and a large static load acting on the pump 8, as a result of the difference between external atmospheric pressure and internal low pressure, becomes evident. This load causes a contraction in the length of the vacuum system and, consequently, shortens the axial length of the vibration damper 1. This compression of the damper 1 causes the flanges 11, 12 to move towards one another. As a result, tabs 24, 25 move axially away from one another and the springs 23 each act in tension such that a resistance to the compressive axial loading is experienced within the damper 1.

Figure 6:
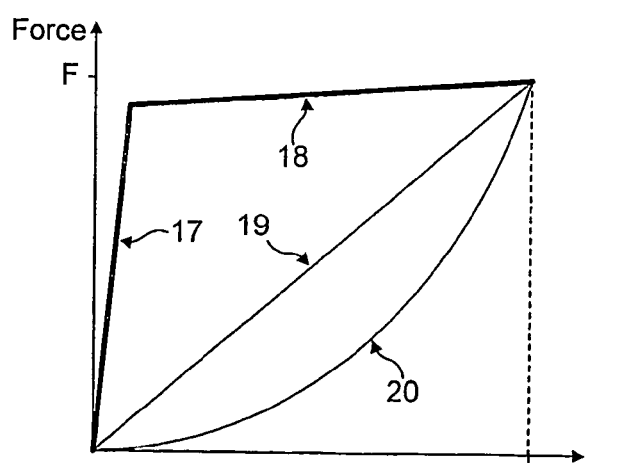
FIG. 6 is a graph indicating the type of stiffness characteristics that are desirable in a vibration damper of FIG. 3.

In order to inhibit transmission of the oscillating force associated with vibrations of the pumping mechanism to the apparatus 7, the vibration damper 1 needs to be compliant. In other words, it must have as low a value of stiffness (commonly designated "k") as possible. Hence the choice of the bellows configuration for the gas barrier 13, since such a component has a very low value of axial stiffness. The stiffness characteristic under loading is, therefore dominated, by the resisliant structure 16. By subjecting the damper 1 to an initial loading (or pre-compression) the initial load v displacement characteristic 17 is very steep, see FIG. 6, which corresponds to a large effective stiffness value as it is dominated by the pre-compression means, here the interlinked straps 14, 15. Once the axial compressive displacement goes beyond the initial pre-compressed limit such that the linked straps 14, 15 return to equilibrium and lose contact with one another, the considerably lower value of stiffness characteristic 18 becomes active. This lower stiffness value (represented by the shallow gradient at 18 in FIG. 6) is dominated by the tension springs 23 in the resistant structure 16, with some contribution (typically approximately 20%) from the bellows 13.

Figure 7:
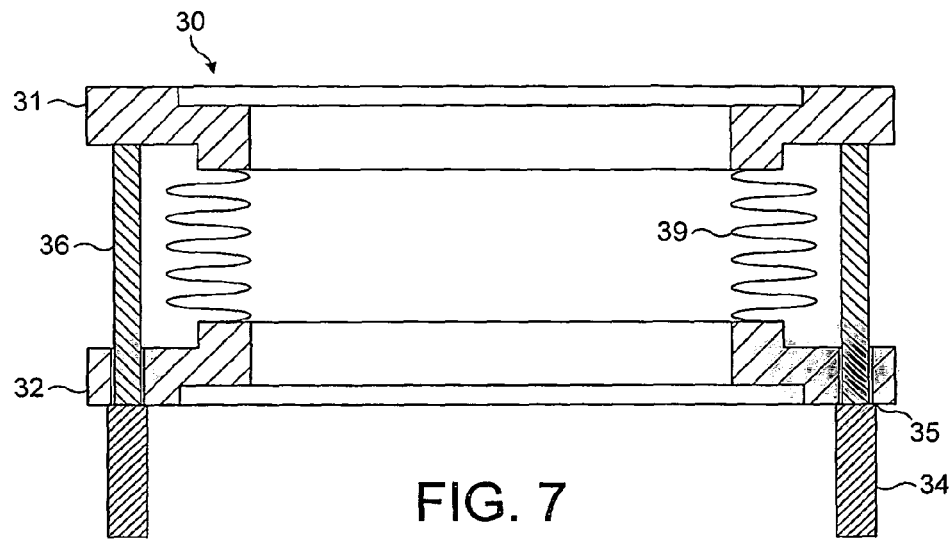
FIG. 7 is a schematic cross sectional representation of another embodiment of the present invention, with an alternative configuration of the compression resisting means.

In some conventional vibration dampers the axial length of the damper is large and conductance losses experienced can become significant. In the vibration damper of FIG. 3 such losses are not significant, however there are some applications where it is desirable to improve the configuration in order to achieve an even higher quality vacuum. It is widely known that improvements in conductance of a vacuum system are achieved by maintaining large diameter openings of short length. A damper 30 representing an improved conductance is exemplified in FIGS. 7 and 8.

In this damper 30, spring support members 36 are attached to one flange 31 only, the support members 36 protruding through clearance holes 37 in the other flange 32. The support members 36 are provided with shoulders 35, formed by an increased diameter portion 34 of each support member 36, beyond which the second flange 32 is prevented from passing. This mechanism effectively provides pre-compression of the damper 1 without the need for straps 14, 15 which enables the fluid flow path to be cleared of obstacles.

Figure 8:
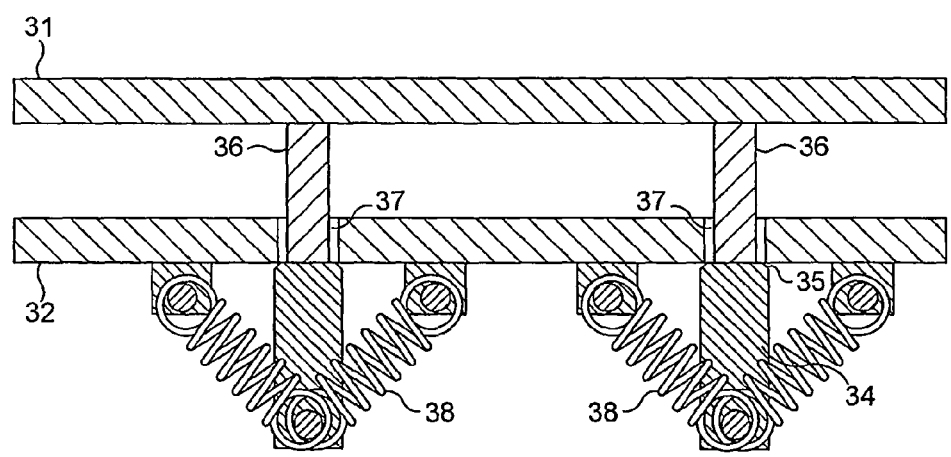
FIG. 8 is a flat sheet development of the compression resisting means of FIG. 7.

Springs 38 are attached from the distal end of members 34 to the bottom surface (as shown in FIG. 8) of flange 32. Consequently, all of the springs 38 are located beneath the flanges 31, 32. This simplification creates shorter space between the flanges 31, 32 of damper 30 than the space between the flanges 11, 12 of damper 1. By decreasing the distance between the flanges, the conductance of the damper 30 is improved. Furthermore, for the same cross section of vibration damper 30, (when compared to damper 1 of the earlier embodiment) a larger diameter bellows component 39 can be introduced to further enhance the conductance value of the damper 30, thus leading to an improved quality vacuum.

Figure 9:
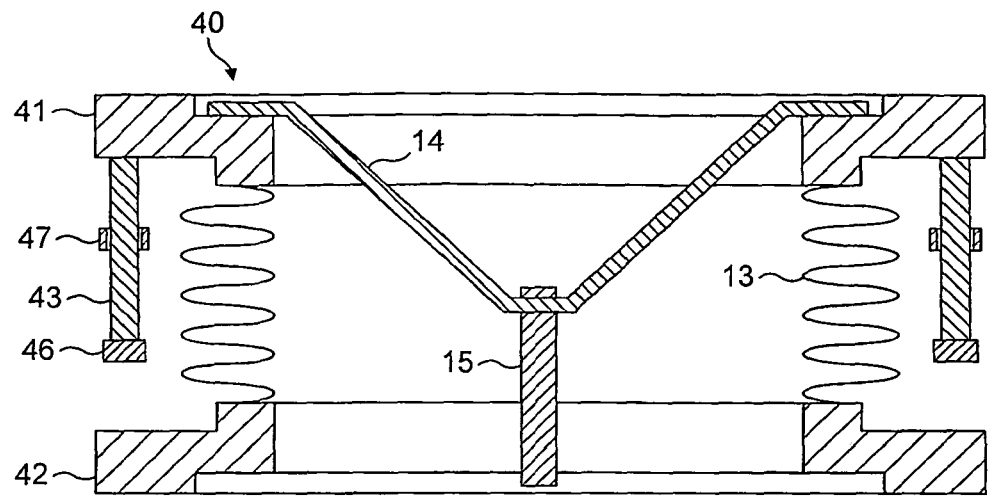
FIG. 9 is a schematic cross-sectional representation of an embodiment of a vibration damper with anti-rotation characteristics.
Figure 10:
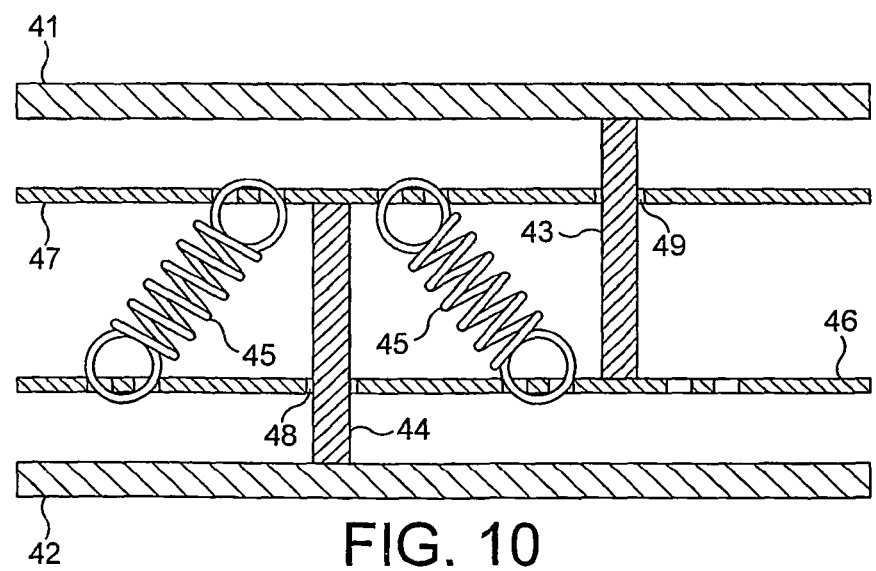
FIG. 10 is a flat sheet development of the compression resisting means of FIG. 9.

FIGS. 9 and 10 illustrate another example of a damper 40 which is similar to the damper 1 illustrated in FIGS. 3, 4 and 5. However, the circumferentially extending tabs 24, 25 of damper 1 illustrated in FIG. 3 have been replaced by complete rings 46, 47 in damper 40. These interference rings 46, 47 perform the same function as tabs 24, 25 in that they form attachment points for springs 45 to enable the damper to resist compressive axial loading through a tensile mode. In addition the interference rings 46, 47 are provided with clearance holes 48, 49 through which support members 43, 44 extend.

In normal operation of the vacuum system, all movement within the vacuum damper 40 is in the axial direction and no contact is made between support members 43 and interference ring 47 or between support members 44 and interference ring 46 due to the provision of clearance holes 48, 49. However, if the vacuum pump 8 seizes in such a way that angular momentum is transferred to a housing of the pump 8 to cause it to rotate relative to the apparatus 7, each interference ring 46, 47 will start to rotate and will, therefore come into contact with respective support members 44, 43. In order for the pump 8 to rotate further, each of these support members 44, 43 must deform. Such deformation takes more energy out of the system and therefore reduces the likelihood that the vacuum pump 8 will be separated from the apparatus 7. Hence, further destruction or injury may be avoided.

Returning now to FIG. 8, it may be noted that in the event of a vacuum pump seizure flange 32 with clearance holes 37 would act as the interference rings 46, 47 in FIGS. 9 and 10, in combination with support members 36.

Figure 11:
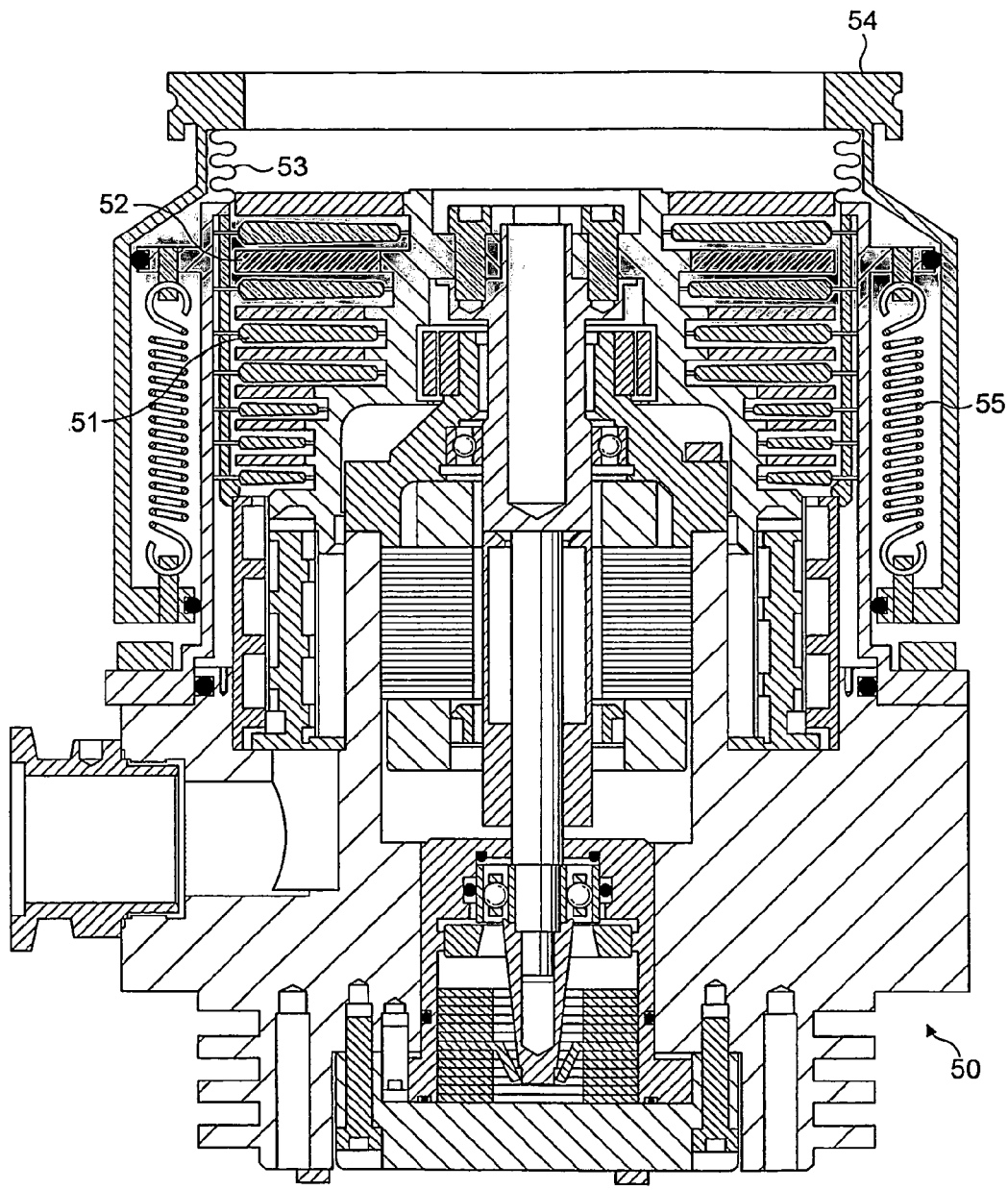
FIG. 11 is a schematic representation of a vacuum pump incorporating a vibration damper similar to that shown in FIG. 7.

The components of the vibration damper may be directly incorporated into the body of a pump 50 as illustrated in FIG. 11 to provide an integrated unit with all of the aforementioned advantages. The pump 50 comprises a stator 51 and a rotor 52 in a known configuration. An inlet component 54 of the pump is separated from the remainder of the housing of the pump 50, as shown in FIG. 11, to allow a compliant structure to be inserted therebetween to couple the inlet 54 to the remainder of the housing to inhibit transmission of vibration from the pump 50 to the apparatus (not shown) which is to be evacuated in operation of the pump. A gas barrier or shield is provided by a compliant steel bellows component 53 as in the aforementioned damper 1 to separate the atmospheric conditions external to the pump with the vacuum conditions internal to the pump. At one end, the bellows component 53 is directly connected to the stator 51 of the pump 50 and at the other end it is connected to the inlet component 54 of the pump. As discussed earlier in the description, in operation, the length of the vacuum system will tend to be compressed. In this embodiment, resistance to compression is provided by tension springs 55. These springs are connected, at respective ends, to the stator 51 of the pump 50 and to the inlet component 54 such that as the pump 50 experiences compressive forces the springs 55 are extended. In this way, the possibility of a failure of components in operation, in a buckling mode, is avoided.

In summary, the present invention provides a pre-compressed vibration damper which enables a much lower stiffness value to be incorporated into the design of the damper. This lower stiffness value is desirable in order to inhibit vibration being transmitted from the vacuum pump to the apparatus being evacuated.

Furthermore, the typical compression resistance structure has been replaced by an equivalent structure that experiences tensile deflection rather than compressive deflection such that buckling forces are avoided.

Finally, a damper is provided which presents improved safety of the vacuum system in use by provision of a rotation inhibiting configuration such that the possibility of reducing destruction of the system during pump failure is improved.

While the foregoing description and drawings represent the preferred embodiments of the present invention, it will be apparent to those skilled in the art that various changes and modifications may be made therein without departing from the true spirit and scope of the present invention.

I claim:

1. A vibration damper for inhibiting transfer of vibration to an apparatus during the evacuation thereof by a pump, the damper comprising:
   a bellows arrangement for isolating from the ambient atmosphere, fluid drawn from the apparatus by the pump, and
   means for limiting axial compression, of the bellows arrangement during use of the damper,
   wherein the damper is axially pre compressed by means for limiting axial extension of the bellows arrangement, but simultaneously permitting axial compression of the same,
wherein the means for limiting axial compression comprises resistive means arranged under tension in such a way that when the damper is subjected to an external axial force tending to compress the bellows arrangement, the resistive means is subjected to a tensile force, the resistance to extension of the resistive means opposing axial compression of the bellows arrangement.

2. The vibration damper according to claim 1 wherein the bellows arrangement extends about an axis and the resistive means is arranged about said axis.

3. A vibration damper for inhibiting transfer of vibration to an apparatus during the evacuation thereof by a pump, the damper comprising a bellows arrangement for isolating from the ambient atmosphere, fluid drawn from the apparatus by the pump, wherein the bellows arrangement extends about an axis, and resistive means arranged about said axis and under tension so that when the damper is subjected to an external axial force tending to compress the bellows arrangement, the resistive means is subjected to a tensile force, the resistance to extension of the resistive means opposing axial compression of the bellows arrangement, wherein the damper is axially pre-compressed by means for limiting axial extension of the bellows arrangement, but simultaneously permitting axial compression of the same.

4. The vibration damper according to claim 3 wherein the resistive means is arranged about the damper.

5. The vibration damper according to claim 1 wherein the resistive means is arranged about the pump.

6. The vibration damper according to claim 5 wherein the resistive means is attached to the housing of the pump.

7. The vibration damper according to claim 1 wherein the resistive means is arranged about the bellows arrangement.

8. The vibration damper according to claim 1 wherein the resistive means comprises a plurality of resistive elements.

9. The vibration damper according to claim 8 wherein each resistive element comprises a metal coil tension spring.

10. The vibration damper according to claim 8 wherein each of the resistive elements is inclined relative to a plane extending orthogonally to said axis.

11. The vibration damper according to claim 8 wherein each resistive element is attached at one end to a first radially extending flange and at the other end to a second radially extending flange, the first and second radially extending flanges being axially separated.

12. The vibration damper according to claim 11 wherein said one end of the resistive element is attached to the first radially extending flange via a support member.

13. The vibration damper according to claim 12 wherein the support member extends through an aperture in the second radially extending flange.

14. The vibration damper according to claim 12 wherein the other end of the resistive element is attached to the second radially extending flange.

15. The vibration damper according to claim 12 comprising means for contacting the support member upon rotation of one flange relative to the other to inhibit relative rotational movement therebetween.

16. The vibration damper according to claim 1 wherein the resistive means is arranged about the damper.

17. The vibration damper according to claim 4 wherein the resistive means is arranged about the pump.

18. The vibration damper according to claim 17 wherein the resistive means is attached to the housing of the pump.

19. The vibration damper according to claim 18 wherein the resistive means is arranged about the bellows arrangement.

20. The vibration damper according to claim 19 wherein the resistive means comprises a plurality of resistive elements.

* * * * *